Figure 1:
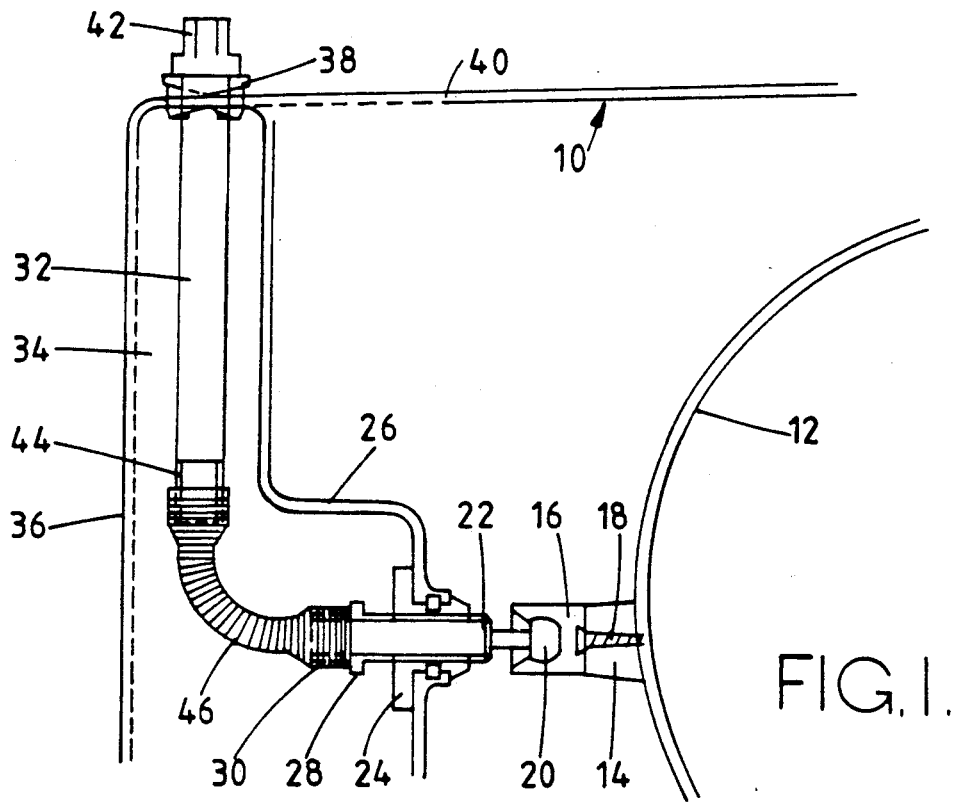

United States Patent
Osborn

[11] Patent Number: 5,079,685
[45] Date of Patent: Jan. 7, 1992

[54] LAMP ASSEMBLY

[75] Inventor: Graham S. Osborn, Brownhills, England

[73] Assignee: Carello Lighting plc, Straffordshire, England

[21] Appl. No.: 618,719

[22] Filed: Nov. 27, 1990

[30] Foreign Application Priority Data

Dec. 5, 1989 [GB] United Kingdom ............... 8927484

[51] Int. Cl.$^5$ ........................ B60Q 1/06; F21V 21/18
[52] U.S. Cl. ................................. 362/421; 362/418; 362/424; 362/66
[58] Field of Search .................... 362/421, 418, 66, 61, 362/420, 424

[56] References Cited

U.S. PATENT DOCUMENTS

| | | | |
|---|---|---|---|
| 4,709,306 | 11/1987 | Harris et al. | 362/68 |
| 4,737,891 | 4/1988 | Burton | 362/66 |
| 4,742,435 | 5/1988 | Van Duyn et al. | 362/66 |
| 4,845,598 | 7/1989 | Watanabe et al. | 362/421 |
| 4,916,583 | 4/1990 | Nagasawa | 362/61 |

FOREIGN PATENT DOCUMENTS 1400858 7/1975 Fed. Rep. of Germany ...... 362/418

Primary Examiner—Ira S. Lazarus
Assistant Examiner—Y. Quach
Attorney, Agent, or Firm—Trexler, Bushnell, Giangiorgi & Blackstone, Ltd.

[57] ABSTRACT

A lamp assembly has a lamp reflector body adjustably mounted on a support in the form of a housing through a horizontal screw-threaded rod which engages in an internally screw-threaded element fixed to the housing. A vertical rod is mounted in the housing and terminates in an external end portion which is located so as to be easily turned manually by a spanner, socket or screwdriver. A coil spring serves to transmit drive from the vertical rod to the screw-threaded rod to adjust the reflector body relative to the housing.

9 Claims, 1 Drawing Sheet

LAMP ASSEMBLY

This invention relates to a lamp assembly and is more particularly, though not exclusively, concerned with a motor vehicle headlamp assembly. In a motor vehicle headlamp assembly, it is known to mount a dished reflector body adjustably within an open fronted housing forming a support for mounting the reflector body on the motor vehicle. Such mounting is by way of a three point system wherein a screw threaded rod forming part of each of two of the three points permits tilting movement about an axis passing through the other mounting points. The mounting points are arranged at the corners of a right triangle orientated so that tilting of the reflector body about a horizontal axis and a vertical axis selectively for headlamp beam adjustment purposes can be effected by selective rotation of the screw threaded rods. The screw threaded rods extend horizontally fore-and-aft of the headlamp assembly and also project rearwardly through the housing to terminate in rear end regions which are shaped to enable manual rotation e.g. by means of a spanner and/or screw driver. However, it is not always easy to gain access to these end portions because of the confined space in the region behind the headlamp assembly.

It is an object of the present invention to provide a lamp assembly wherein adjustment of the reflector body relative to the support can be facilitated.

According to the present invention, there is provided a lamp assembly comprising a support, a reflector body, and mounting means adjustably mounting the reflector body on the support, said mounting means including a rotatable screw-threaded rod and an internally screw-threaded element engaged with the latter, the arrangement being such that rotation of the screw-threaded rod moves the body relative to the support, wherein a manual adjustment member is mounted on the support for rotation about an axis which is inclined relative to the axis of rotation of the screw-threaded rod, and an angled drive operably interconnects the manual adjustment member and the screw-threaded rod so that rotation of the manual adjustment member in use causes rotation of the screw-threaded rod and thereby adjustment of the reflector body relative to the support.

In a preferred embodiment, the screw-threaded rod is rotatable about a substantial horizontal axis whilst the manual adjustment member is rotatable about a substantially vertical axis. The terms "vertical" and "horizontal" refer to the orientation of the respective parts when the lamp assembly is in an orientation corresponding to that in which it is intended to be used.

Most preferably, the manual adjustment member is mounted on an upper surface of the support.

The invention is most preferably applicable to the type of lamp assembly wherein the support takes the form of an open fronted housing in which the reflector body is mounted, and wherein the housing is provided with an upper surface towards the rear thereof, and the manual adjustment member is rotatably mounted on said upper surface of the housing.

Most conveniently, the angled drive takes the form of a coil spring which is connected at one of its ends with the manual adjustment member and at the other of its ends with the screw-threaded rod. In a particularly convenient arrangement, the coil spring is engaged with a screw-threaded region associated with the manual adjustment member and a screw-threaded region associated with the screw-threaded rod.

In one convenient embodiment, the screw-threaded rod is mounted on the support through the internally screw-threaded element which is fixedly mounted on the support, the screw-threaded rod being provided with a part-spherical end which engages with a part-spherical socket mounted on the reflector body.

In another convenient embodiment, the screw-threaded rod is mounted on the support so as to be freely rotatable relative thereto but restrained from axial movement, and the internally screw-threaded element is mounted on the reflector body, preferably for limited pivotal movement relative thereto.

Figure 2:
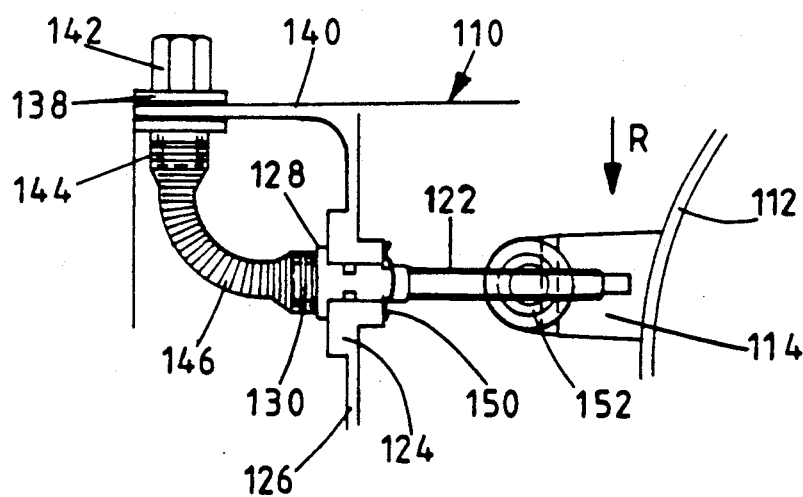
Figure 3:
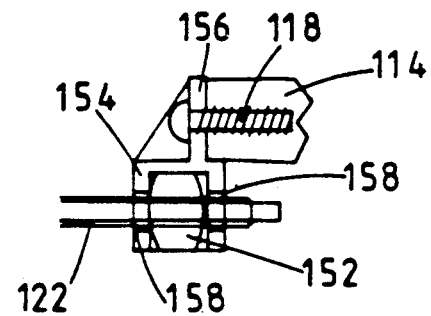

Embodiments of the present invention will now be described, by way of example, with reference to the accompanying drawing, in which:

FIG. 1 is a sectional view showing part of a lamp assembly according to one embodiment of the present invention, FIG. 2 is a sectional view showing part of a lamp assembly according to another embodiment of the present invention, and, FIG. 3 is a view in the direction of arrow R in FIG. 2.

Referring now to FIG. 1 of the drawing, the lamp assembly illustrated therein is a motor vehicle headlamp assembly comprising a synthetic resin housing 10 containing a reflector body 12 which is adjustably mounted therein via a three point mounting system permitting pivotal movement of the reflector body 12 relative to the housing 10 independently about vertical and horizontal axes, the points lying on the corners of a right triangle whose plane is vertically disposed. The reflector body 12 is moulded out of a thermosetting synthetic resin material with three rearwardly extending integral lugs 14 (only one shown). Each lug 14 has a part-spherical socket 16 secured thereto by means of a screw 18. The socket 16 which is illustrated in FIG. 1 has snap-engaged therewith a part-spherical end 20 formed at the inner end of a horizontally disposed, externally screw threaded rod 22 extending fore-and-aft of the headlamp assembly. The rod 22 is engaged with an internally screw-threaded bush 24 mounted in an internal partition 26 in the housing 10. The screw-threaded rod 22 extends through the partition 26 and is provided with an abutment flange 28 serving to separate a screw-threaded outer end region 30 from the remainder of the screw-threading of the rod 22.

A vertically disposed rod 32 is mounted in an internal recess 34 in the housing 10 between the partition 26 and an end wall 36 of the housing 10. The rod 32 is supported by the housing 10 for rotation about its vertical axis via a bush 38 mounted in an aperture adjacent the rear of an upper horizontal surface 40 of the housing 10. The rod 32 extends vertically upwardly to project outwardly of the housing 10 and is provided with an outer end portion 42 having a hexagon shape and/or a slot to enable manual rotation of the rod 32 about a vertical axis relative to the housing 10 using a suitable tool such as a spanner, hexagon socket or screwdriver.

At its lower end, the rod 32 is provided with an externally screw-threaded end region 44.

An angled drive in the form of a coil spring 46 is mounted in the recess 34. One end of the coil spring 46 is engaged with the screw threaded end portion 44 of the rod 32 whilst the other end is engaged with the screw-threaded end region 30 of the rod 22 and abuts against the flange 28. The pitch of the turns of the coil spring 46 is such that an interference fit on the screw threaded end portions 44 and 30 is ensured.

In use, manual rotation of the end 42 using a suitable tool causes rotation of the rod 32 about a vertical axis. This rotary movement is transmitted to the rod 22 via the coil spring 46. Rotation of the rod 22 results in horizontal displacement thereof relative to the housing 40 and thereby movement of the reflector body 12. Because of the three point mounting system, pivotal movement of the reflector body 12 about a horizontal axis is permitted. An adjusting mechanism similar to that described above is provided for one of the other points of the three-point mounting system, but the positioning of the socket 16 of this other mounting point relative to the reflector body 12 and to the other points is such that pivotal movement of the reflector body about a vertical axis takes place. The third attachment point is provided by a rod (not shown) which is fixedly mounted on the partition 26 and which has a part-spherical end snap fitted into the respective socket. Such point of attachment merely permits limited universal pivotal movement of the reflector body without linear displacement. Three-point attachment systems between reflector bodies and lamp housings are per se known in the motor vehicle headlamp reflector field and will not be described herein in any further detail.

Referring now to FIGS. 2 and 3 of the drawings, the embodiment illustrated therein is similar to that described above in relation to FIG. 1 and similar parts are accorded the same reference numerals but in the 100 series. In this embodiment, a slightly different arrangement is shown, this time for manually tilting reflector body 112 about a vertical axis using the three-point mounting system. Externally screw threaded rod 122 is freely rotatable in bush 124 which is integrally formed with internal wall 126 of housing 110. Flange 128 abuts against rear face of bush 124, whilst a spring clip 150 restrains the rod 122 against axial movement but permits rotation of the latter relative to the bush 124 about a horizontal axis. The screw threaded rod 122 is operatively engaged with internally screw-threaded element 152 mounted in a sleeve 154 provided with an integrally formed mounting flange 156. The flange 156 is secured to lug 114 using screw 118. The rod 122 passes with slight clearance through aligned holes 158 formed in the wall of the sleeve 154. The internally screw-threaded element 152 has a generally barrel-shaped external surface so that limited universal movement of the element 152 within the sleeve 154 is permitted. This serves to mitigate binding of the element 154 on the rod 122 during adjustment.

Whilst in the above described embodiments, the coil spring 46 or 146 transmits drive through a right angle, it will be appreciated that it may be used to transmit drive through any other angle so that the position of the manually adjustable part 42 or 142 can be selected so as to ensure easy access thereto for adjustment purposes when the headlamp assembly is mounted in position on a motor vehicle. In the above described embodiments, the parts 42 and 142 are mounted at the rear of the upper surfaces 40, 140 of the respective housings 10 and 110 in order to maximise accessibility thereof for adjustment purposes.

What is claimed:

1. A lamp assembly comprising a support (10; 110), a reflector body (12; 112), and mounting means adjustably mounting the reflector body (12; 112) on the support (10; 110), said mounting means including a rotatable screw-threaded rod (22; 122) and an internally screw-threaded element (24; 152) engaged with the latter, the arrangement being such that rotation of the screw-threaded rod (22; 122) moves the reflector body (12; 112) relative to the support (10; 110), characterized in that a manual adjustment member (32, 42; 138, 142) is mounted on the support (10; 110) for rotation about an axis which is inclined relative to the axis of rotation of the screw-threaded rod (22; 122), and in that an angled drive (46; 146) operably interconnects the manual adjustment member (32, 42: 138, 142) and the screw-threaded rod (22; 122) so that rotation of the manual adjustment member (32, 42; 138, 142) in use causes rotation of the screw-threaded rod (22; 122) and thereby adjustment of the reflector body (12; 112) relative to the support (10; 110) said angled drive including a coil spring which is connected at one of its ends with the manual adjustment member (32, 42; 138, 142) and at the other of its ends with the screw-threaded rod (22; 122).

2. A lamp assembly as claimed in claim 1, wherein the screw-threaded rod (22; 122) is rotatable about a substantial horizontal axis whilst the manual adjustment member (38, 42; 138, 142) is rotatable about a substantially vertical axis.

3. A lamp assembly as claimed in claim 1, wherein the manual adjustment member (32, 42; 138, 142) is mounted on an upper surface (40; 140) of the support (10; 110).

4. A lamp assembly as claimed in claim 1, wherein the support (10; 110) takes the form of an open fronted housing in which the reflector body (12; 112) is mounted, and wherein the housing is provided with an upper surface (40; 140) towards the rear thereof, and the manual adjustment member (32; 138) is rotatably mounted in said upper surface (40; 140) of the housing (10; 110).

5. A lamp assembly as claimed in claim 1, wherein the coil spring (46; 146) is engaged with a screw-threaded region (44; 144) associated with the manual adjustment member (32; 138) and a screw-threaded region (30; 130) associated with the screw-threaded rod (22; 122).

6. A lamp assembly as claimed in claim 2, wherein the manual adjustment member (32, 42; 138, 142) is mounted on an upper surface (40; 140) of the support (10; 110).

7. A lamp assembly as claimed in claim 2, wherein the support (10; 110) takes the form of an open fronted housing in which the reflector body (12; 112) is mounted, and wherein the housing is provided with an upper surface (40; 140) towards the rear thereof, and the manual adjustment member (32; 138) is rotatably mounted in said upper surface (40; 140) of the housing (10; 110).

8. A lamp assembly as claimed in any one of the preceding claims, wherein the screw-threaded rod (22) is mounted on the support (10) through an internally screw-threaded element (24) which is fixedly mounted on the support (10), the screw-threaded rod (22) being provided with a part-spherical end (20) which engages with a part-spherical socket (16) mounted in the reflector body (12).

9. A lamp assembly as claimed in any one of claims 1-4, 5, 6, 7, wherein the screw-threaded rod (122) is mounted on the support (110) so as to be freely rotatable relative thereto but restrained from axial movement, and an internally screw-threaded element (124) is mounted on the reflector body (112).

* * * * *